(12) United States Patent
Gilson

(10) Patent No.: US 10,257,081 B2
(45) Date of Patent: *Apr. 9, 2019

(54) MULTIPATH COMMUNICATION IN A NETWORK

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,825

(22) Filed: Mar. 9, 2017

(65) Prior Publication Data

US 2018/0026875 A1 Jan. 25, 2018

Related U.S. Application Data

(63) Continuation of application No. 13/719,780, filed on Dec. 19, 2012, now Pat. No. 9,628,373.

(51) Int. Cl.
*H04L 12/707* (2013.01)
(52) U.S. Cl.
CPC .................................. *H04L 45/24* (2013.01)
(58) Field of Classification Search
CPC ..... H04L 45/24; H04L 1/189; H04L 29/0854; H04L 67/1095; H04L 1/242
See application file for complete search history.

(56) References Cited

U.S. PATENT DOCUMENTS

| 5,612,959 | A | 3/1997 | Takase et al. |
| 6,314,087 | B1 | 11/2001 | Oh |
| 6,408,000 | B1 | 6/2002 | Lamberg et al. |
| 2001/0005371 | A1 | 6/2001 | Sera |
| 2002/0107980 | A1 | 8/2002 | Kawaguchi |
| 2003/0065974 | A1 | 4/2003 | Lam et al. |
| 2005/0163145 | A1 | 7/2005 | Dombkowski et al. |
| 2007/0133531 | A1 | 6/2007 | Kodama et al. |
| 2008/0267181 | A1* | 10/2008 | Monga ............... H04L 45/00 370/390 |
| 2009/0238183 | A1 | 9/2009 | Wu |
| 2012/0307629 | A1 | 12/2012 | Vasseur et al. |
| 2012/0307631 | A1 | 12/2012 | Yang et al. |

OTHER PUBLICATIONS

Kuznetsov, Alexey N., "Policy Routing—Multiple Route Tables Example," IPROUTE2 Utility Suite Howto, Feb. 23, 2001, pp. 1-33, <www.policyrouting.org/iproute2.doc.html#ss9.16>.

* cited by examiner

*Primary Examiner* — Kan Yuen
(74) *Attorney, Agent, or Firm* — Banner & Witcoff, Ltd.

(57) ABSTRACT

Ways of sending data over a network over a single path or over multiple parallel paths on an as-needed basis depending upon network conditions, and/or other factors, are described. For example, if a computing device detects sufficient jitter and/or latency at one or more network interfaces, the data may be sent over two or more communication paths using two or more network interfaces.

20 Claims, 10 Drawing Sheets

MULTIPATH COMMUNICATION IN A NETWORK

CROSS REFERENCE TO RELATED APPLICATIONS

This application is a continuation of, and claims priority to, U.S. patent application Ser. No. 13/719,780, filed Dec. 19, 2012, entitled "MULTIPATH COMMUNICATION IN A NETWORK", the disclosure of which is incorporated by reference herein in its entirety and made part hereof.

BACKGROUND

Most networks experience delivery problems such as jitter and latency, and are designed to work within realistic expectations of such limitations. For example, some networks offer quality of service (QoS) features that specially handle certain designated data at the expense of timely delivery of other data.

Moreover, QoS may not be available in all network configurations. This is especially true when transitioning between two different network types. The transferring network may provide the sender a certain QoS level, yet the transferee network may not honor the QoS level. Moreover, QoS may not be helpful or efficient in certain situations, such as when one or more network interfaces and/or paths are congested or unavailable. In that case, the network may throttle back large portions of data traffic to prioritize the QoS traffic, thereby potentially impacting the network and users on a magnified scale. The foregoing and/or other drawbacks are addressed by this disclosure.

SUMMARY

Some aspects as described herein provide ways of sending data over a single path or over multiple parallel paths in one or more networks on an as-needed basis depending upon network conditions and/or other factors. For example, if one or more computing devices detect sufficient jitter and/or latency at one or more network locations, such as at network interfaces of the computing device(s), then a computing device may choose to redundantly send two or more instances of the data over two or more communication paths, which may comprise, for example, sending data through two or more network interfaces. One or more of the instances may be generated by, for example, replicating a portion of the data or the entirety of the data. The two or more network interfaces may be different types of network interfaces, and the routing for each may utilize different routing information, (for example, by utilizing one or more different routing tables, one for each network interface) for the same or similar data. For example, the same data may be sent generally concurrently over a wireless network interface and a wired network interface. A device that receives the data may utilize (e.g., process or forward) only the first-received instance of the data, and may ignore any subsequent instances of the data. By using two (or even more) parallel communication paths in this way, a potential effect may be to reduce the average latency and/or jitter experienced between the sending and receiving devices or between any other two or more locations (e.g., hops) within a network. The lowest latency link may win on, for example, a per-packet basis. Where problematic network conditions are not detected (e.g., low jitter and/or low latency), then the sending device may choose to send the data over only a single one of the network interfaces (or fewer network interfaces). Such dynamic choice of network interface utilization based on network conditions may result in a more efficient use of network interfaces than if multiple network interfaces were used all of the time regardless of network conditions.

One or more aspects described herein are directed to a method, apparatus, system, and software for performing at least the following set of steps: replicating, by at least one computing device, first data to generate second data. First routing information may be used to determine a first communication path based on a destination of the first data, and second routing information may be used to determine a second communication path, different from the first communication path, based on the destination. The first data may be sent over the first communication path and the second data may be sent over the second communication path.

One or more further aspects described herein are directed to a method, apparatus, system, and software for performing at least the following: sending, by at least one computing device, a first instance of data to a network destination using a first network interface of the at least one computing device. The at least one computing device may determine that a congestion condition exists at the first network interface. If so, then the at least one computing device may send a second instance of the data to the network destination using a second network interface different from the first network interface.

One or more further aspects described herein are directed to a method, apparatus, system, and software for performing at least the following: detecting, by at least one computing device, a condition of at least a portion of a network, determining a quantity of network interfaces based on the detected condition, and using the determined quantity of network interfaces to send data.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
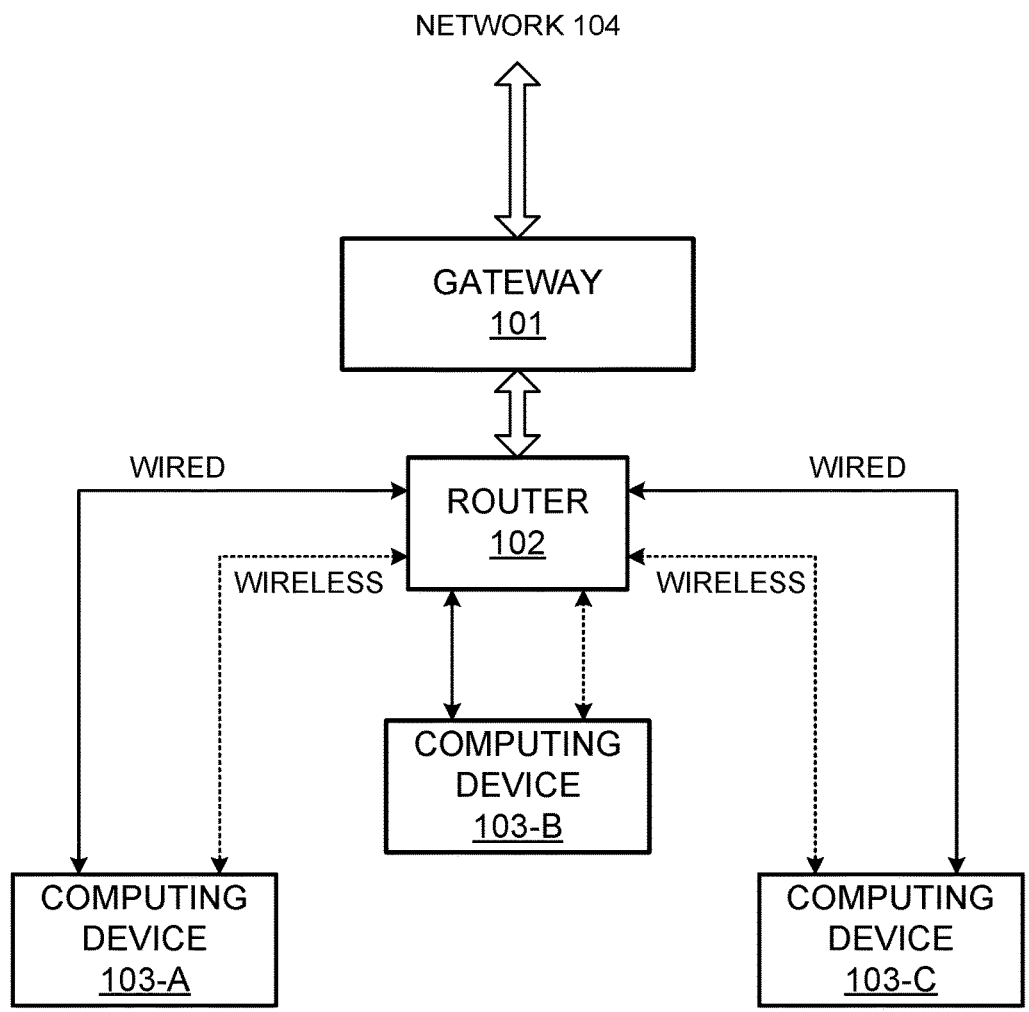
FIG. 1 is a block diagram showing an example system that may be used in accordance with one or more aspects described herein.

FIG. 1 is a block diagram showing an example system that includes a gateway device 101 coupled to a router device 102 and one or more computing devices 103 (in this example, computing devices 103-A, 103-B, and 103-C). The gateway device 101, the router device 102, and the one or more computing devices 103 may together be part of a network, such as a local area network, that may in turn be coupled to another network 104 via the gateway device 101.

The other network 104 may include any one or more networks, such as but not limited to the Internet, a cellular network, a landline telephone network, a wireless network, a wired network, a satellite network, a coaxial cable network, a hybrid-fiber-coaxial network (e.g., a DOCSIS-compliant network), an intranet, an extra-net, a wide-area network, an in-home network, a service provider network, and/or a local-area network.

The gateway device 101 may be responsible for communicating between the network containing the elements 102 and 103, and the other network 104. The communication may be in a bidirectional or unidirectional (e.g., in an upstream or downstream direction). The gateway device 101 may be or otherwise include, for example, any one or more computing devices, modems, and/or other communication interfaces for communicating in a bidirectional or unidirectional manner with the other network 104. For example, where the other network 104 is or otherwise includes a DOCSIS network, the gateway device 101 may include a coaxial cable modem configured to communicate with a DOCSIS network. In further examples, the gateway device 101 may communicate with the other network 104 via an Ethernet connection, a universal serial bus (USB) connection, and/or a wireless connection (e.g., an IEEE 802.11 wireless connection and/or a cellular wireless network connection). Where the network that includes the router 102 and the computing devices 103 uses a particular method of communication (e.g., wired and/or wireless), the gateway device 101 may likewise have a corresponding one or more physical and/or logical ports for communicating with those devices 102 and 103 (e.g., one or more Ethernet connections, one or more USB connections, one or more coaxial cable connections, an antenna with an IEEE 802.11 compatible transceiver, and the like).

The router device 102 may be physically part of the gateway device 101 or it may be a physically separate device from the gateway device 101. The router device 102 may be responsible for routing data amongst the various computing devices 103 and/or between the computing devices 103 and the gateway device 101. The router device 102 may also have one or more ports for communicating with the gateway device 101 (e.g., an Ethernet connection, a USB connection, and/or a coaxial cable connection) and with the computing devices 103, such as via Ethernet connections, USB connections, coaxial cable connections (such as in the case of a MoCA network), and/or a wireless connection.

Each of the computing devices 103 may be or otherwise include any type of computing device, such as but not limited to a desktop computer, a laptop computer, a tablet computer, a server, a handheld computer (e.g., a smart phone), a smart television set, a digital video recorder, a video game console, and/or a set-top box. One or more of the computing device 103 may be configured to communicate with the router device 102 and/or with one or more others of the computing device 103 using one or more different paths (modes) of communication. The one or more paths may include, for example, a wireless path and a wired path. The wireless path may be in the form of, for example, an IEEE 802.11 compliant wireless connection, a BLUETOOTH connection, an infra-red connection, and/or the like. The wired path may be in the form of, for example, an Ethernet cable connection, a coaxial cable connection, a USB cable connection, and/or the like. In the example shown in FIG. 1, each of the computing devices 103 has both a connection to a wired path (indicated by the solid arrowed lines between the computing devices 103) and a connection to a wireless path (indicated by the broken-line arrowed lines between the computing devices 103).

As will be described in further detail below, if the computing device 103-A (for example) intends to send data to the computing device 103-B (for example), then the computing device 103-A may send the data over the wired path between devices 103-A and 103-B and/or over the wireless path between computing devices 103-A and 103-B. In the particular example configuration of FIG. 1, the data may be sent by the computing device 103-A to the computing device 103-B through the router device 102 over one or both of the wired and wireless paths. As another example, if the computing device 103-C intends to send data to the other network 104, then the computing device 103-C may send the data over one or both of the wired and wireless paths. In the particular example configuration of FIG. 1, the data may be sent to the other network through the router device 102 and the gateway device 101 over one or both of the wired and wireless paths. Moreover, for both of these examples, any of the devices 101-103 and 301 may, if desired, convert a wired communication to a wireless communication, and vice-versa. For example, the router device 102 may receive data over a wireless path and route the data out toward the destination over a wired path, and vice-versa.

In any of the above examples, and in any other examples discussed herein, the sending computing device may or may not send the data over both paths (e.g., both the wired and the wireless path) simultaneously. For example, the sending computing device may begin sending the data over each of the two path at the same time, and/or the sending computing device may send the data over both paths such that the sending over one of the paths partially or fully overlap in time with the sending of the data over the other of the paths. In other examples, such as where only a single logical or physical output communication port is available to the sending computer, the sending may be time multiplexed between the two paths (e.g., alternating sending portions of the data on the two paths). In further examples, the data may be sent in time series between the two paths. In other words, the data may be partially or fully sent on a first one of the paths, and then the same data may be partially or fully send on the second one of the paths.

Figure 2:
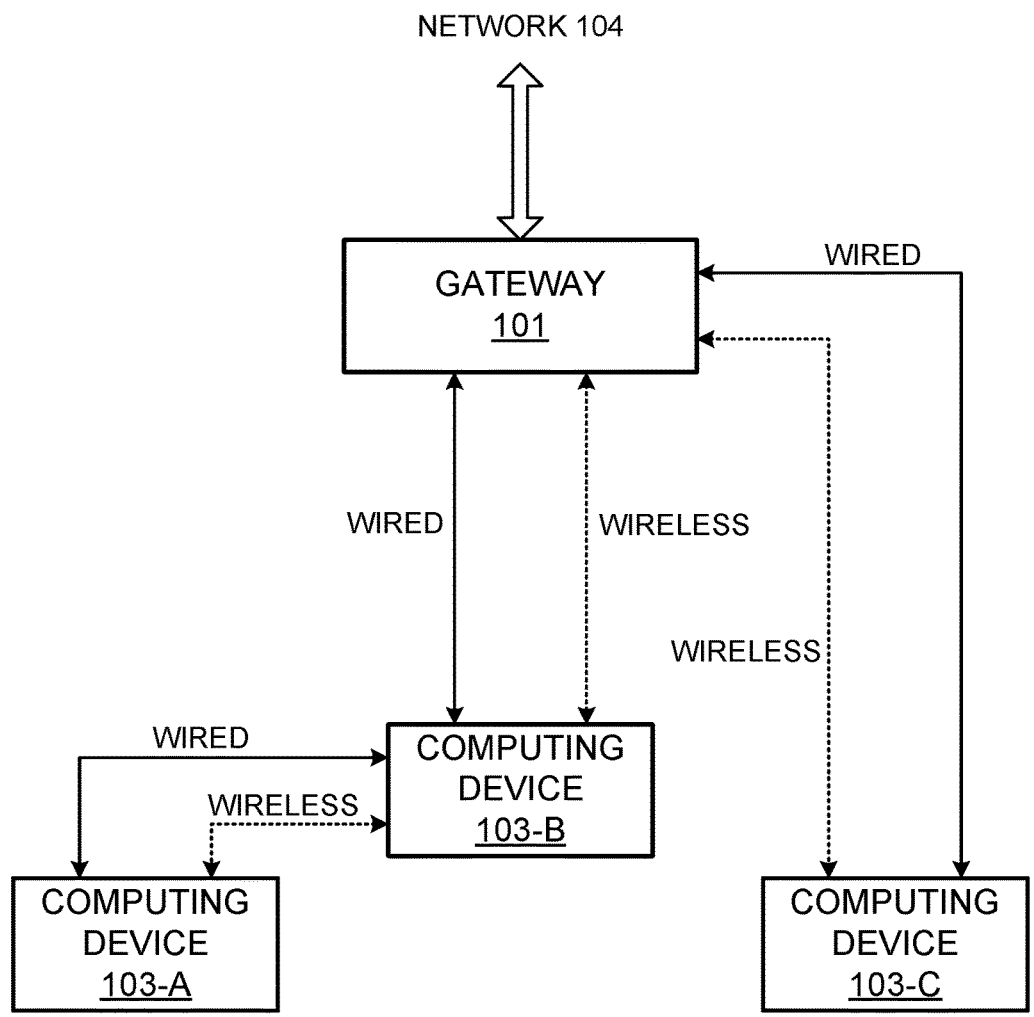
FIG. 2 is a block diagram showing another example system that may be used in accordance with one or more aspects described herein.

FIG. 2 is a block diagram showing another example system. The system of FIG. 2 is similar to the system of FIG. 1, except that in this example, the various computing devices 103 may communicate directly with the gateway device 101 and/or with each other. In this example, the functionality of the router device 102 may not be needed or it may be integrated with (e.g., performed by) the gateway device 101 and/or one or more of the computing devices 103. In further examples, some systems may operate as a hybrid between the systems of FIGS. 1 and 2. For example, the router device 102 may exist and may couple a first subset of the computing devices 103 to the gateway device 101 and/or with one another, and a different second subset of the computing devices 103 may communicate more directly with the gateway device 101 without the intervening router device 102. Moreover, for a given one of the computing devices 103, the router device 102 may be used to couple one of the communication paths between the computing device 103 and the gateway device 101, whereas the other of the communication paths between the computing device 103 and the gateway device 101 may extend directly between the computing device 103 and the gateway device 101. For example, the routing device 102 may be used to assist with wireless communications between the computing device 103-A and the gateway device 101, but not with wired communications between the computing device 103-A and the gateway device 101 (and vice-versa).

Figure 3A:
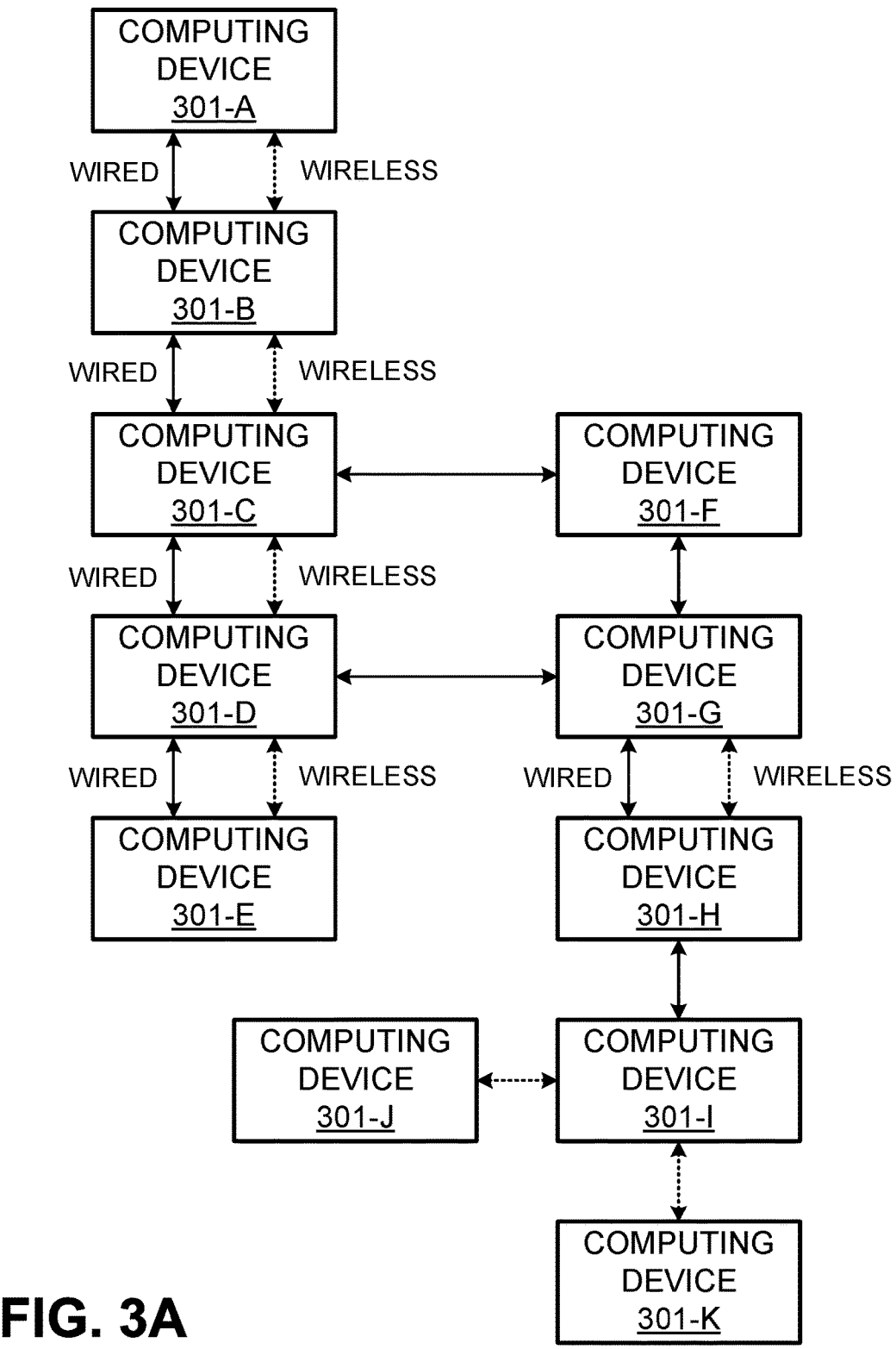
FIGS. 3A to 3C are block diagrams showing yet further examples of a system that may be used in accordance with one or more aspects described herein.

FIG. 3A is a block diagram showing yet another example system that may be used in accordance with one or more aspects described herein. In this example, a plurality of various computing devices 301A-K are interconnected together in one or more networks. Each of the computing devices 301 may be the same type of computing device or a different type of computing device, such as but not limited to personal computers, mobile devices such as smart phones, tablet computers, laptop computers, handheld devices, desktop computers, servers, routers, gateways, set top boxes, digital video recorders, telephone equipment, repeaters, and the like.

The various computing devices 301 may be interconnected in any topology desired. The particular topology shown in FIG. 3A is merely an example. As can be seen, some of the computing devices 301 are coupled to others of the computing devices 301 by two or more redundant communication paths (e.g., both wired and wireless communication paths), whereas others of the computing devices 301 may be coupled to others of the computing devices 301 by only a single communication path (which may be wired or wireless). In other examples, all of the computing device 301 may be coupled to others of the computing devices 301 by two, three, or more redundant communication paths. In the present example, it may be that the computing devices 301-A through 301-E are part of a first network, and that the computing devices 301-F through 301-K are part of a different second network. However, the various computing devices 301 may be in the same network or further subdivided into additional networks, as desired. Moreover, the indication of a "wired" or "wireless" communication path between the computing devices 301 is only an example. For example, the two or more communication paths between any of the computing devices 301 may be of the same type (e.g., all wired, or all wireless). By way of example, the two communication paths shown between the computing device 301-A and the computing device 301-B may alternatively both be wireless paths or both be wired paths, and may utilize the same or different physical network infrastructures.

The redundant sending of the same data between devices may be implemented across all of the computing devices 301 or only amongst one or more subsets of the computing devices 301. For example, the redundant sending of the same data along two or more redundant communication paths may be implemented only for communications amongst the group of computing devices 301-A, 301-B, 301-C, 301-D, and 301-E, and between the computing devices 301-G and 301-H. Thus, for example, if the computing device 301-A is sending data to the computing device 301-E, then the entire path through hops 301-B, 301-C, and 301-D may utilize redundant communication by each of the computing devices 301-A, 301-B, 301-C, and 301-D sending the same data (e.g., two or more instances of the data) through both wired and wireless communication paths. If, on the other hand, the computing device 301-A is sending data to the computing device 301-I, then the path through hops 301-B, 301-C, and 301-D may utilize the above-discussed dual redundant sending of the same data. Then, the computing device 301-D may send only a single instance of the data to the computing device 301-G. Then, the computing device 301-G may send the same data over both wired and wireless paths to the computing device 301-H, which in turn may send only a single instance of the data to the destination computing device 301-I.

Figure 3B:
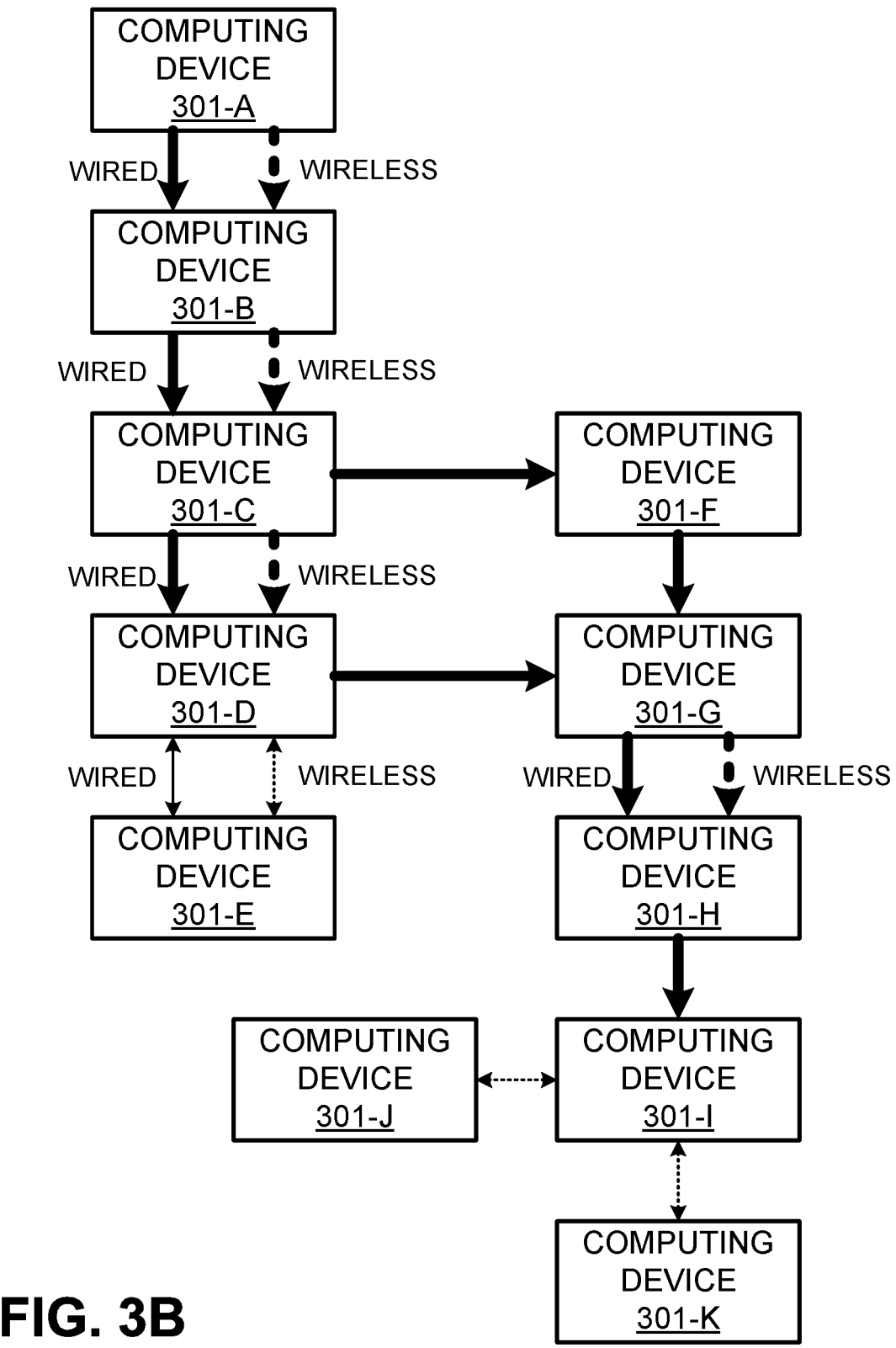

Moreover, the two sets of redundant data need not be sent over the same hops. For example, assume that the computing device 301-A initiates a connection to send a data packet and its replicated instance of the data packet to the computing device 301-I. As shown by way of example in FIG. 3B, where the paths taken by data packet instances are indicated by thicker lines, the first instance of the packet may travel through the following hops: 301-A, 301-B, 301-C, 301-F, 301-G, 301-H, and then 301-I. The second instance of the same packet may travel (e.g., at least partially simultaneously) through the following hops: 301-A, 301-B, 301-C, 301-D, 301-G, 301-H, and 301-I. The computing device 301-A may send the first instance of the data packet through its wireless network interface to the computing device 301-B and the second instance of the data packet through its wired network interface to the computing device 301-B, or vice-versa. Moreover, any of the hops may, if desired, translate the type of communication path over which a given one of the data packets travel. For example, the computing device 301-B may receive one of the copies of the data packet over its wireless network interface, and may forward the data packet on to the computing device 301-C using its wired network interface, or vice-versa. Or, the computing device 301-B may continue using the same type of communication path for a given data packet. Thus, the computing device 301-B, for example, may receive a data packet over its wired network interface and resend that data packet to the computing device 301-C over its wired network interface (and the same may go for its wireless network interface). Upon receiving either of the data packet instances, the computing device 301-C may thus send one of the instances of the data packet to the computing device 301-C (via its wired or wireless network interface) and the other of the instances of the data packet to the computing device 301-F (again, via its wired or wireless network interface).

Eventually, in the above example, it may be expected that both instances of the data packet will arrive at the computing device 301-I. As described further below, the computing device 301-I may use the first-arriving instance of the data packet and ignore (for example, discard) any later-arriving instances of the data packet. Moreover, such ignoring of later-arriving data packet instances may be performed at any of the hops over which the data packet traverses, and not necessarily at the destination. For example, if any of the hops in either of the two communication paths of this example were to receive two instances, or copies, of a data packet, that hop may only utilize (e.g., forward) the first-arriving instance.

Figure 3C:
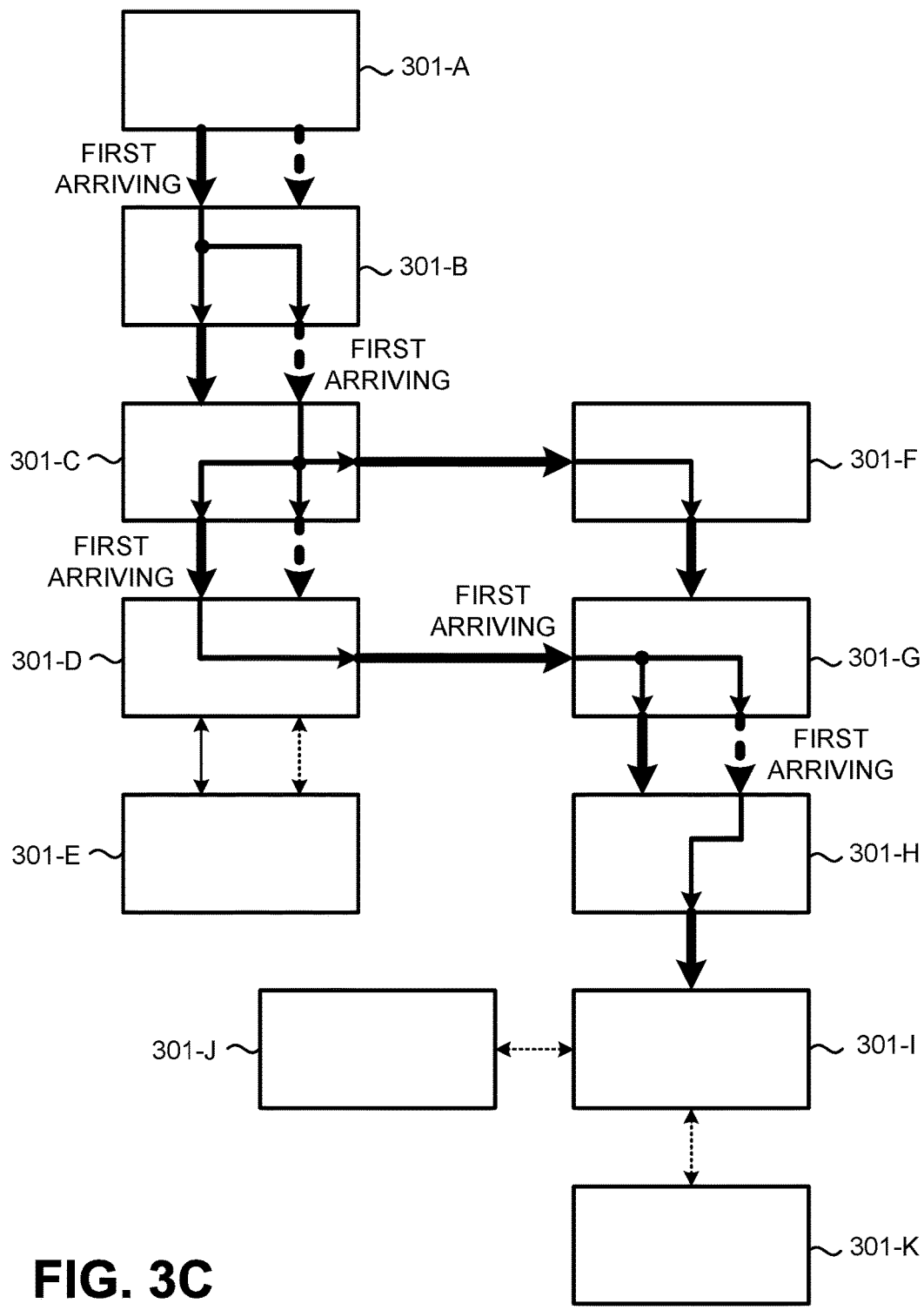

For example, referring to FIG. 3C, when the computing device 301-B receives the first-arriving instance of the data packet from the computing device 301-A, the computing device 301-B may forward two instances of the data packet to the computing device 301-C (e.g., over both wired and wireless communication paths), and may ignore the second-arriving instance of the data packet. Likewise, when the computing device 301-C receives the first-arriving instance of the data packet from the computing device 301-B, the computing device 301-C may forward three instances of the data packet (two to the computing device 301-D and one to the computing device 301-F), and may ignore the second-arriving instance of the data packet. In addition, the decision at any given hop whether to replicate a data packet for forwarding may be made depending upon any one or more factors, such as network congestion measured and/or predicted at one or more of the network interfaces of that hop. As can be seen, any combination of redundant and non-redundant communication paths may be provided in one or more networks, and the redundant sending of the same data may be implemented in only a subset of the hops between a source and destination. Alternatively, the redundant sending of the same data may be implemented through the entire path between the source and the destination. Moreover, the type of sending (redundant or not redundant) may dynamically change over time between any two given hops, depending upon whether a given hop determines that redundant sending is appropriate. In addition, the type of sending (redundant versus non-redundant) may be transparent to the user and/or to the source and/or destination devices, depending upon which hops between the source and destination perform redundant transmission. As will be discussed further below, such a determination may be based at least in part on network conditions from the point of view of the sending device (or other network conditions such as network conditions remotely reported to the sending device from another device).

Figure 4:
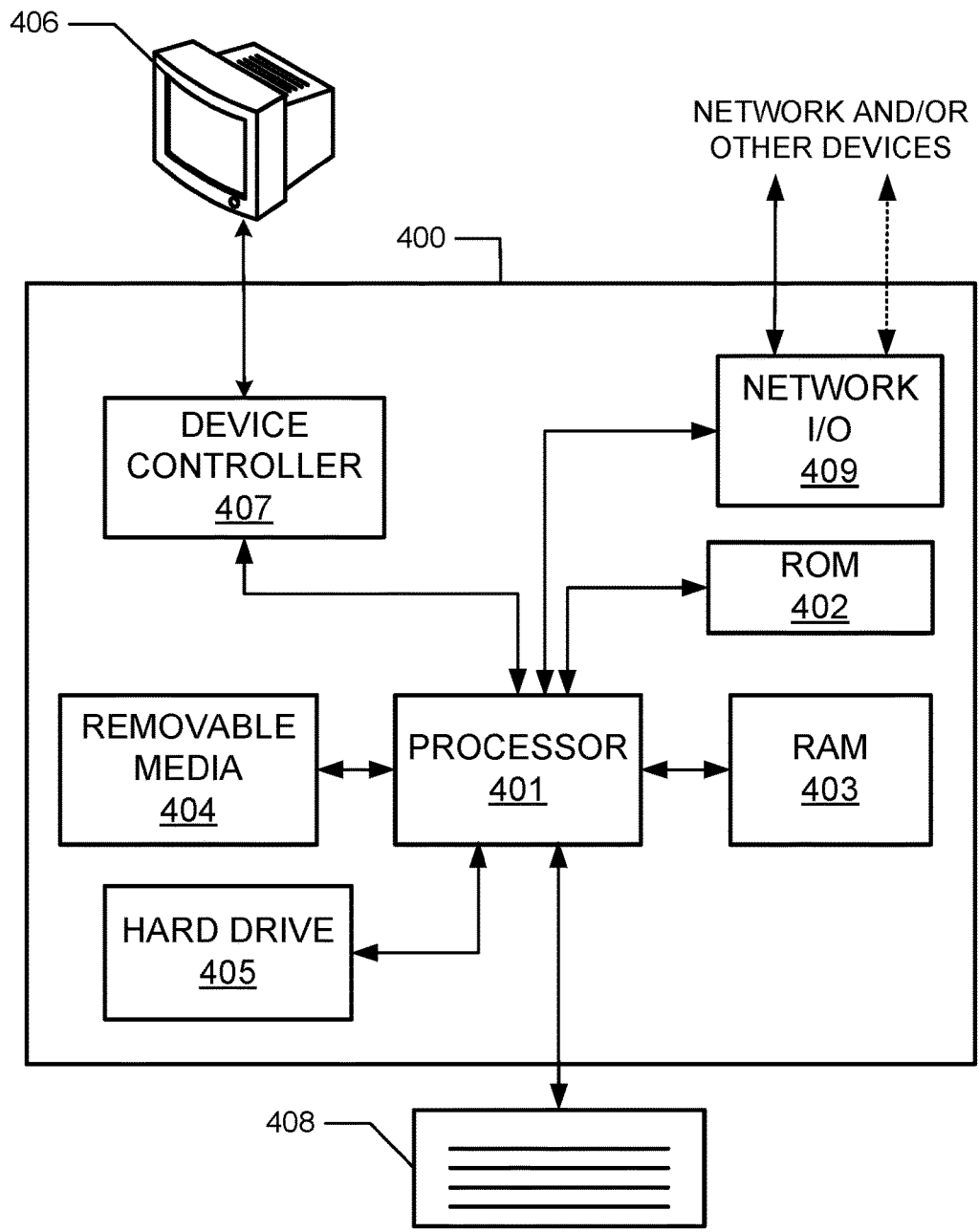
FIG. 4 is a block diagram of an example of a computing platform on which the various elements described herein can be implemented.

FIG. 4 illustrates, by way of example, general hardware elements that may be used to implement a computing device 400 as any of the various computing devices and/or software discussed herein, such as, but not limited to, any of the elements 101-104 and 301. The computing device 400 may include one or more processors 401, which may execute instructions of a computer program to perform any of the features described herein. The instructions may be stored in any type of computer-readable medium or memory, to configure the operation of the processor 401. For example, instructions may be stored in a read-only memory (ROM) 402, random access memory (RAM) 403, an attached or internal hard drive 405, removable media 404 such as a USB drive, compact disk (CD) or digital versatile disk (DVD), floppy disk drive, and/or any other desired electronic storage medium. The computing device 400 may include one or more output devices, such as a display 406 (or an external television), and may include one or more output device controllers 407, such as a video processor. There may also be one or more user input devices 408, such as a remote control, keyboard, mouse, touch screen, microphone, etc. The computing device 400 may also include one or more network interfaces, such as input/output circuits 409 (such as a network card) to communicate with one or more other networks (e.g., network 104) and/or with one or more other devices. The interface may be a wired interface, wireless interface, or a combination of the two. The interface 409 may include, for example, a modem (e.g., a cable modem), an Ethernet connection, a universal serial bus (USB) connection, an antenna, an infra-red light emitter, an infra-red light receiver, a radio-frequency receiver, and/or a radio-frequency transmitter.

Figure 5:
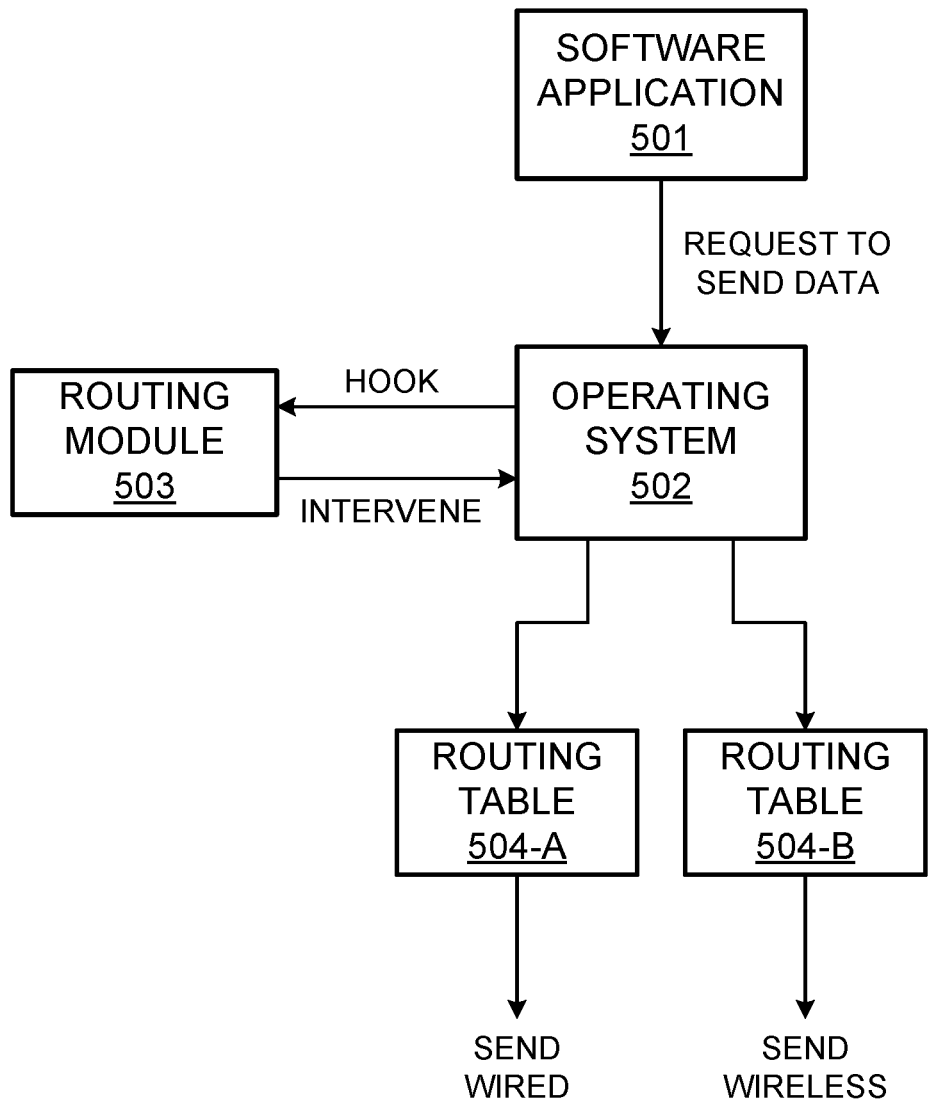
FIG. 5 is a block diagram of an example configuration of a computing device, such as the computing device of FIG. 4.

FIG. 5 is a block diagram of an example configuration of a computing device, such as any of the computing devices 101-104 and 301. In this example, a software application 501, an operating system 502, a routing module 503, and/or one or more different sets of predetermined routing information, such as one or more different routing tables (in this example, routing tables 504-A and 504-B), may be stored and/or implemented by the computing device. Any of the elements 501-504 may be partially or fully embodied as computer-executable instructions, other data, hardware, and/or firmware. For example, where the elements 501-504 include computer-executable instructions, other data, and/or firmware, the computer-executable instructions may be partially or fully stored in the ROM 202, the RAM 203, the removable media 204, and/or the hard drive 205, and the computer-executable instructions may be implemented (e.g., executed) by at least the processor 201 and/or by one or more other processors.

The software application 501 may be or otherwise include any type of software application, such as but not limited to an operating system, a web browser, an instant messaging software application, an audio phone software application, a multimedia (e.g., audio and/or video) phone software application, a server-side multimedia streaming software application, a client-side multimedia player software application, and/or a gaming software application. The software application 501 may be separate from the operating system 502, partially or fully integrated as part of the operating system 502, and/or in the form of an independent software application or a plugin or other type of module that is designed to operate as part of another software application. Regardless of the type of software application, the software application may be configured to send data to and/or receive data from another device or network. For example, where the software application 501 and the other elements 502-504 are implemented on the computing device 103-A, the software application may be configured to send data to and/or receive data from another computing device, such as from the computing device 103-C. As another example, the software application implemented on the computing device 103-A may be configured to send data to and/or receive data from another network, such as the other network 104 (e.g., via the router device 102 and/or the gateway device 101). As yet another example, where the software application 501 and/or the other elements 502-504 are implemented on the gateway device 101, the software application may desire to send data to and/or receive data from the other network 104 and/or any of the other elements 102 and/or 103. The data may represent, for example, signaling data, streaming multimedia (e.g., audio and/or video) content, a file, a remote user interface such as an interactive menu screen or electronic program guide, a website, etc.

The routing module 503 may operate as a process running between the application and network layers (referring to OSI model layers). Or, the routing module 503 may be part of a software application or a separate software application. Where the routing module 503 is part of the operating system 502, it may be fully or partially integrated with the operating system 502.

In operation, the software application 501 may, for example, be configured to cause the computing device executing the software application 501 to send data to another device. To do so, the software application 501 may initiate a request to send the data, where the request may be directed to the operating system 502. The request may be in the form of, for example, one or more application programming interface (API) commands. In other examples, the request may bypass the operating system or be originated by the operating system. In any of these examples, the routing module 503 may be configured to detect the request to send data. This may be done such as by using an appropriately placed software hook that is triggered by the request, and/or by modifying the operating system 502 itself. Without the routing module 503, the operating system 502 might operate on the request directly by referring to routing information to determine how to send the data to the other device. However, in this example, the routing module 503 may intervene by processing the request before the operating system 502 completes (and perhaps even before the operating system 502 begins) its own processing of the request. As will be described in further detail below, the routing module 503 may intervene by, e.g., modifying and/or replicating the request. For example, the routing module 503 may selectively modify the request so that the request is a request to send the data over both a wired path and a wireless path. Or, the routing module 503 may selectively replicate the request and/or the data, resulting in a first request to send the data over the wired path and a second request to send the data over the wireless path.

In some examples, the request from the software application 501 may not itself specify which path type (e.g., wired versus wireless) is to be used to send the data; rather, this may be determined by, e.g., the operating system 502 in response to the request. In such examples, the routing module 503 may dynamically determine, or may intervene to cause the operating system 502 to dynamically determine, whether to send the data over a wired path, a wireless path, or both.

After the routing module 503 has intervened, and once the operating system 502 (for example) has regained control of the modified request or the replicated requests, the operating system 502 may use the request to refer to the appropriate one or more sets of routing information (e.g., routing tables 504) to send the data along the correct path(s). For example, the routing table 504-A may be a routing table for sending data over a particular wired path, and the routing table 504-B may be a routing table for sending data over a particular wireless path. Routing information, such as routing tables, of a given computing device may generally include information the immediate topology of the network as seen from the computing device. For example, the routing information may associate one or more network interfaces with one or more network destinations. In some examples, each set of routing information is responsible for providing such routing/topology information for one of the network interfaces of a computing device. Thus, if data is to be sent over two network interfaces (e.g., a wired network interface and a wireless network interface), then two sets of routing information, e.g., two routing tables, (one for each of the two network interfaces) may be used to route the data toward the intended destination. In many examples described herein, the intended destination using both sets of routing information may be the same destination (e.g., the same device and/or the same network address), albeit the data may be routed over two different communication paths of the network in accordance with the routing information. Also, while examples are described in which a different set of routing information is used for each network interface, a single shared set of routing information may be used for two or more of the network interfaces. In such a case, the routing information may list one or more network interfaces for each listed destination, and different portions of the set of routing information may be used for the various network interfaces.

Figure 6:
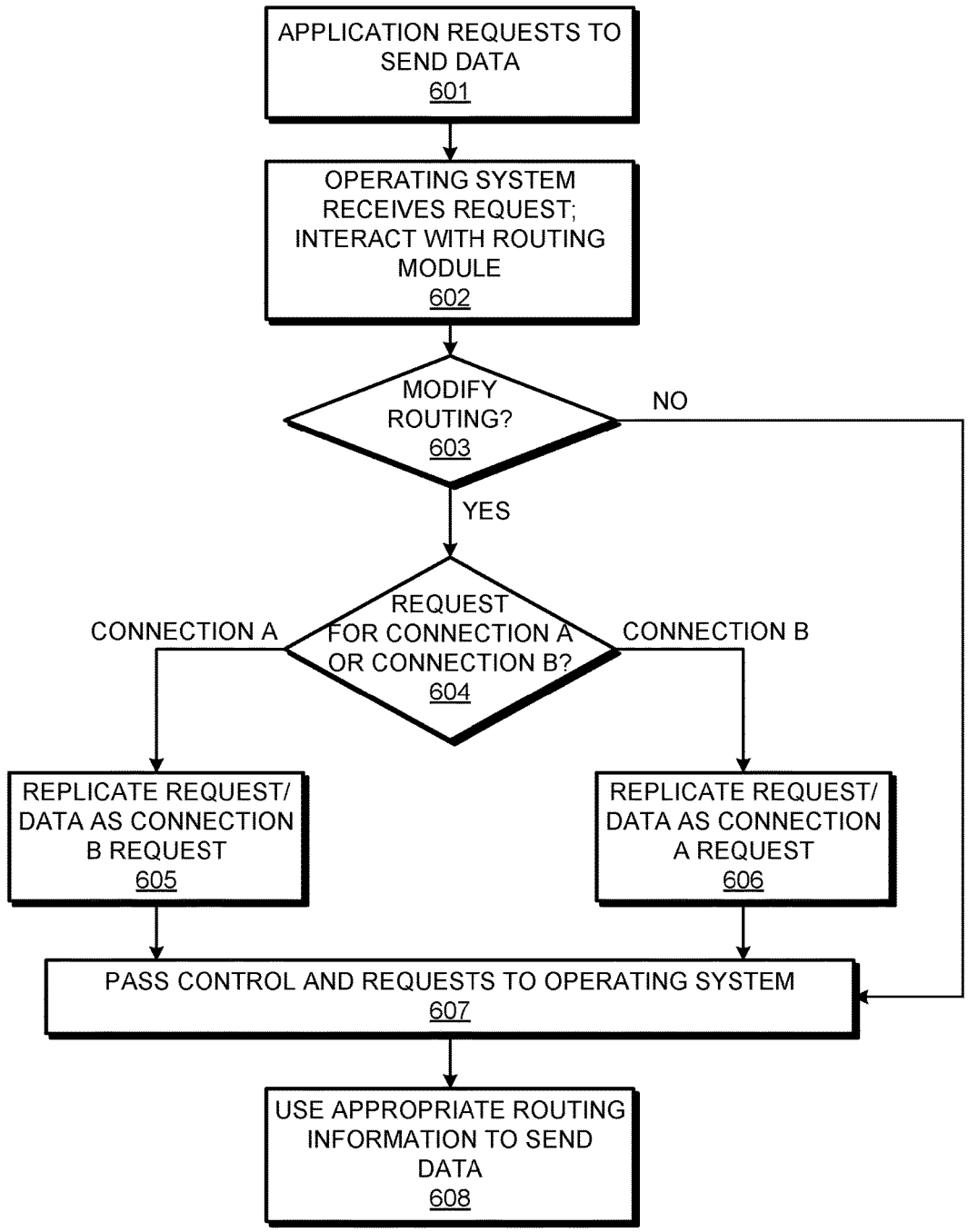
FIG. 6 is a flow chart of an example method that may be performed in accordance with one or more aspects as described herein.

FIG. 6 is a flow chart of an example method that may be performed in accordance with one or more aspects as described herein. The method includes steps that may be used for, e.g., sending data from a computing device (e.g., any of elements 101-104 and 301) to one or more destinations (e.g., any others of the elements 101-104 and 301). The various steps in this flow chart may be performed by one or more devices and/or humans, such as any of the elements of FIGS. 1-5. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 601, the software application 501 executing on a sending device may initiate a request to send data to one or more destinations indicated by the request. The request may indicate a particular destination such as by a network address (e.g., IP address or MAC address) and/or other identifier associated with the destination, and/or a particular network connection over which to send the data. The indicated destination may be a final destination of the data and/or the request may indicate one or more intermediate network hops. In the present example, it will be assumed that the sending device is the computing device 103-A and that the destination is the computing device 103-B. Moreover, while it is assumed in this example for the sake of simplified explanation that only a single destination is indicated by a given request, it will be understood that a request may indicate more than one destination (e.g., in a multicasting or broadcasting scenario). In such a case, any modification, replication, and/or other processing of a request may be performed as described herein for any or all of the indicated destinations. The request may merely indicate that subsequent data is to be sent, or the request itself may be or otherwise include some or all of the data to be sent. Moreover, the request may be or otherwise include a dedicated message or packet containing the substance of the request, and/or the request may be implemented as, for example, a header of one or more data packets that contain the data to be sent in packet payloads.

At step 602, the operating system 502 and/or the routing module 503 may receive the request. For example, as previously discussed, the routing module 503 may intercept the request prior to any processing of the request by the operating system 502 and/or during processing by the operating system 502. As also previously discussed, for example, an appropriate software hook may be installed such that the routing module 503 receives an instance of the request and/or the request is redirected to the routing module 503. In either case, the operating system 502 may or may not temporarily hand control of the request over to the routing module 503. Where the routing module 503 is separate from the operating system 502, the request may be processed as described below with regard to steps 603-607 by the routing module 503. Where the routing module 503 is part of the operating system 502, the request may be processed as described below with regard to steps 603-607 by the operating system 502.

At step 603, the routing module 503 and/or the operating system 502 (depending upon whether the routing module 503 is separate from the operating system 502) may determine whether routing of data indicated by the request should be modified. The outcome of the step 603 determination may be based on one or more factors, such as, but not limited to, information contained in the request (e.g., the indicated destination of the data, a priority of the data, and/or an indicated quality of service designation); a current (e.g., measured) and/or predicted condition (e.g., feedback and/or collected information about operational status, available bandwidth, jitter, latency, congestion, and/or experienced errors) of one or more communication paths that the data might traverse; a property of the data to be sent (e.g., the type, priority, and/or format of the data such as multimedia versus text); and/or a property of the external environment (e.g., the current time of day, the identity of a user associated with the data, a system status). Thus, under some network conditions, replication may not be performed, and under other network conditions, replication may be performed. Also, under some network conditions, more replication may be performed (e.g., replicate more than once to result in multiple copies of the data), and under other network conditions, less replication may be performed (e.g., replicate once or more than once, but resulting in a smaller number of copies of the data). As a further example, the decision whether to replicate data (and/or how many times to replicate the data) may depend upon a priority and/or some other property of the data. For example, data indicated (or otherwise known to be) more important may be replicated for redundant transmission while less important data may not be replicated. Regardless of the factors used to decide whether to replicate data for redundant transmission, the decision whether or not to replicate data may be made dynamically and may change over time for various portions of the data (e.g., for different data packets).

In addition to determining whether to replicate the data, step 603 may also involve determining, based for example on any of the above-mentioned factors, which and/or how many of the communication paths are to be redundantly used. For example, if it is determined that a particular communication path (e.g., as experienced by the network interface sending data over the communication path) has a congestion condition such as a large amount of jitter and/or latency, then it may be determined to supplement the communication path with another communication path (e.g., via a different network interface) or not to use that communication path at all to route the data. The determination of whether a congestion condition exists may include, for example, determining whether the latency exceeds a predetermined latency threshold and/or the jitter exceeds a predetermined jitter threshold.

Figure 7:
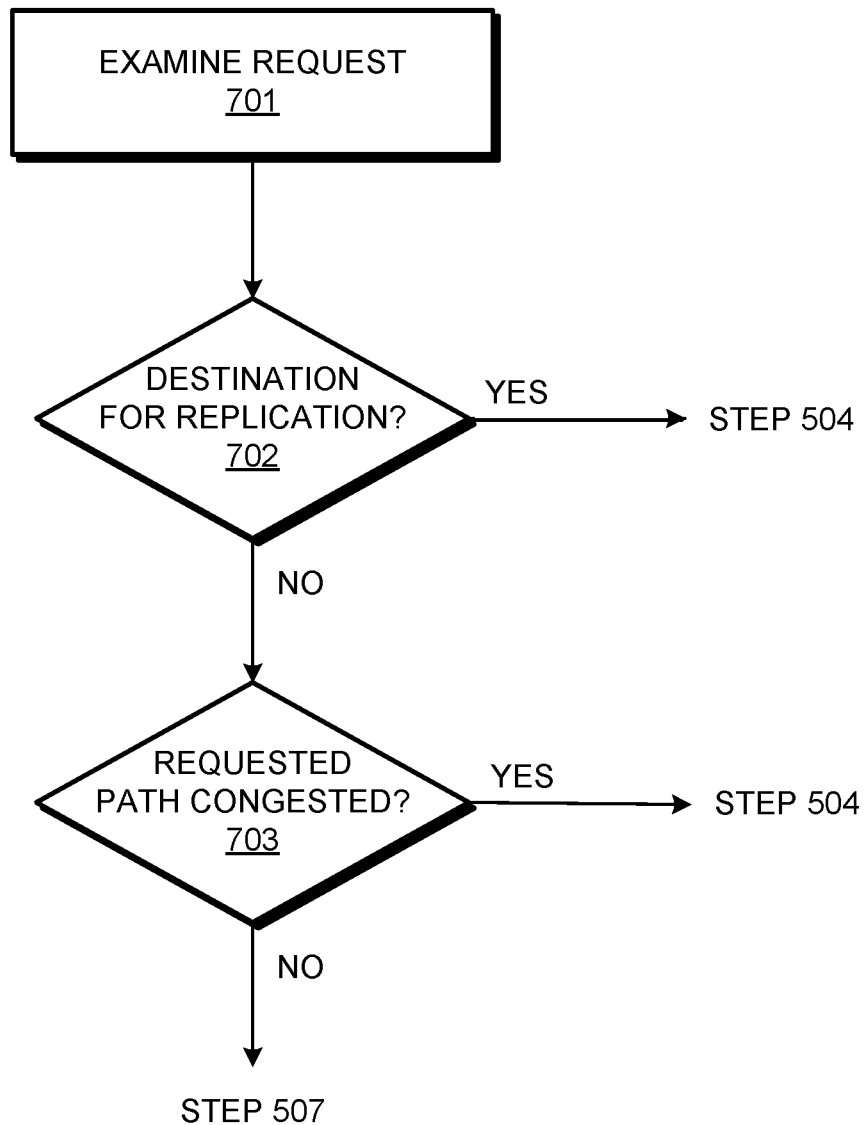
FIG. 7 is a flow chart of another example method that may be performed in accordance with one or more aspects as described herein.

FIG. 7 shows an example of how step 603 may be implemented. In this example, steps 701-703 may all be sub-steps of step 603. At step 701, the request is received and examined, such as by the routing module 503. At step 702, it may be determined whether the destination indicated by the request is a destination for which requests should be replicated. In such an example, a predetermined table or other set of information may exist that associates one or more destinations with an indication of replication and/or of no replication. For example, the set of information may indicate that for a first destination, requests should not be replicated, whereas for a second destination, requests are to be replicated. The routing module 503 may use this set of information to look up, for a given indicated destination, whether the request is to be replicated. If so, then this may be noted (e.g., by setting a replication flag to a first value) and the process may move to step 604. If not, then this may be noted (e.g., by setting the replication flag to a second value) and the process may move to step 703. In some cases, the value of the replication flag may indicate the number of times that the data and/or the request should be replicated.

At step 703, it may be determined whether the path over which the data is to be routed is experiencing a congestion condition or is expected to be congested. This may be determined in any number of ways, such as by measuring the latency and/or jitter experienced by the network interface and comparing the measured value(s) with a predetermined threshold latency value and/or a predetermined threshold jitter value. If it is determined that a congestion condition is present, then it may be determined that the request should be replicated, and so this may be noted (e.g., by setting the replication flag to the first value) and the process may move to step 604. If not, then this may be noted (e.g., by setting the replication flag to the second value) and the process may move to step 607. The process of FIG. 7 is but one possible way that step 603 may be implemented. There are many other possible permutations and combinations of factors that may be taken into account to make the determination of step 603. While the steps of FIG. 7 determine whether or not a request is to be replicated, these steps could alternatively be performed to determine whether a request is to be modified rather than, or in addition to, replication of the request. Moreover, while the steps of FIG. 7 are shown in a particular order and divided into specific steps, it will be understood that the order may be modified, and that one or more of the steps may be combined and that one or more of the steps may be further sub-divided into further steps.

Returning to FIG. 6, if the determination during step 603 is that the routing of the data is not to be modified (e.g., by replication and/or modification of the request), then the process may move to step 607, in which control of the request is passed back to the operating system 502 if such passing of control is needed.

If, on the other hand, the determination during step 603 is that the routing of the data should be modified (again, e.g., by replication and/or modification of the request), then the process may move to step 604. At step 604, it may be determined whether the original request is for sending the data over a first network connection ("Connection A") or over a second network connection ("Connection B"). This may be determined at least by, e.g., examining the request. If the request is for sending the data over Connection A, then the process may move to step 605. If the request is for sending the data over Connection B, then the process may move to step 606. Connection A may be a wired network connection and Connection B may be wireless network connection, or vice-versa. Alternatively, Connection A and Connection B may both be the same type of network connection (a wired network connection or a wireless network connection). It can be seen that step 603 may be extended to involve decisions about more than two possible network connections. For example, the sending device may have one or more wired network connections and/or one or more wireless network connections. Thus, there may also be a possible Connection C, Connection D, etc., for a given sending device. Only two possible network connections are explicitly shown step 604 for simplicity of explanation in the present example.

At step 605 (if the request is for sending the data over Connection A), the routing module 503 and/or the operating system 502 may replicate the request and/or the data associated with the request to generate a request for sending over Connection B (e.g., a second request that may be a replicated version of the original request except that the data is to be sent over Connection B toward the destination). Additionally or alternatively, the original request may be modified to request sending the data to the destination both via a wired path and via a wireless path. Where the data is in the form of one or more packets including headers and payloads, the payload of each data packet may be replicated identically. The header of each data packet may also be replicated identically, or may be different. For example, the header may be replicated identically except for one or more items of header information such as an identity of the source of the data packet (e.g., to distinguish between the various network interfaces that may be used by the sending device). The process may then move to step 607.

If, on the other hand, the request is for sending the data over Connection B, then at step 606, the routing module 503 and/or the operating system 502 may replicate the wireless request to generate a request to send over Connection A (e.g., a second request that may be a replicated version of the original request except that the data is to be sent over Connection B toward the destination). Additionally or alternatively, the original request may be modified to a single request sending the data to the destination both via Connections A and B. The process may then move to step 607.

At step 607, if control of the request (and/or of any replicated request) is not with the operating system 502, then such control may be passed back to the operating system 502 and/or to any other appropriate software application. Then, at step 608, the operating system 502 and/or another software application may use one or more the appropriate routing information (e.g., routing tables 504), based on the one or more network connections as determined at steps 603 and 604, to route the data to the indicated destination over one or more paths. For example, the same data may be routed, per the original request and the replicated request, or per the modified request, over one or both of Connections A and B (e.g., over both wired and wireless paths). The same data may then be sent by the sending computing device (e.g., the computing device 103-A) to the destination over the determined network connection(s), e.g., using the network I/O 409.

Figure 8:
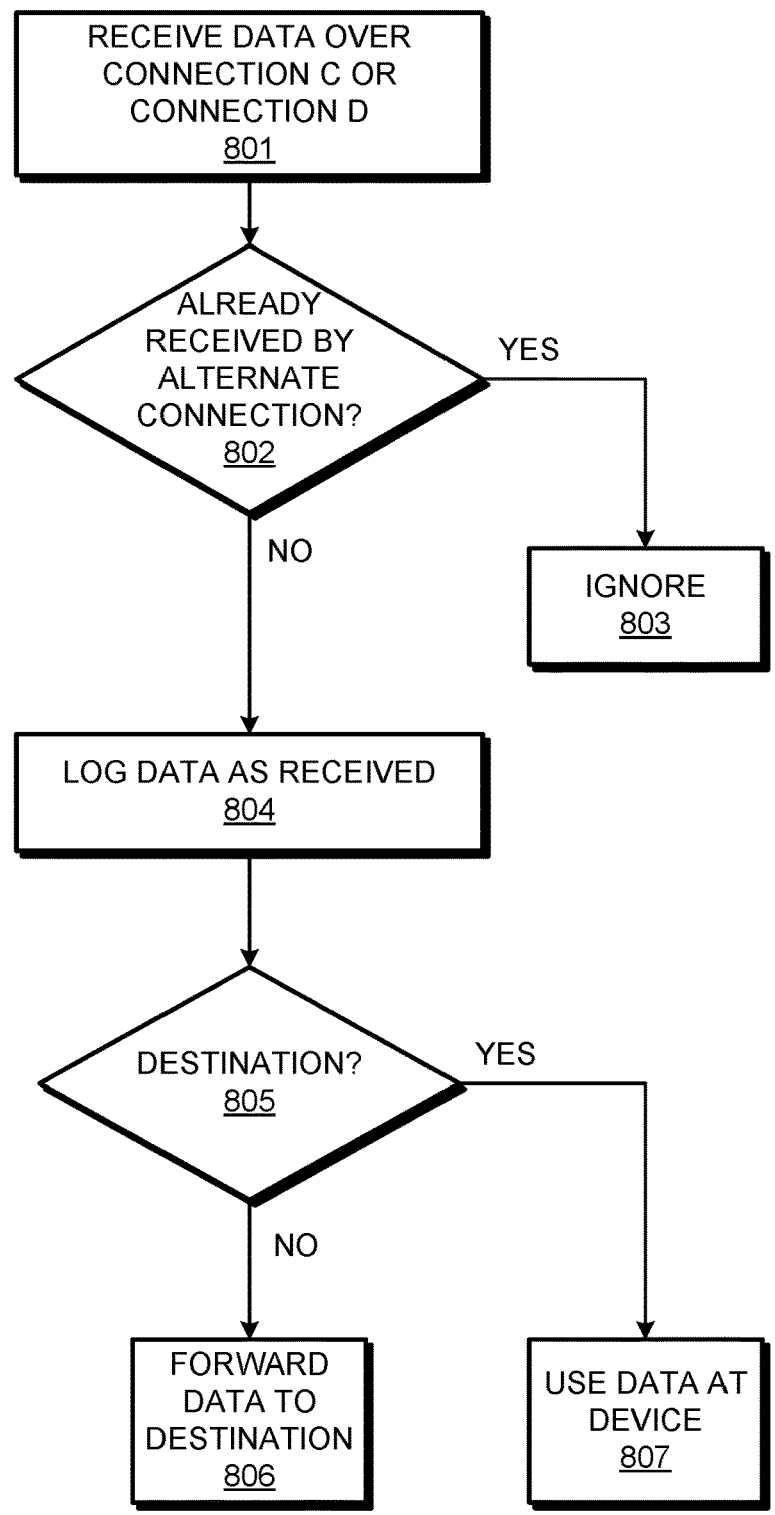
FIG. 8 is a flow chart of yet another example method that may be performed in accordance with one or more aspects as described herein.

FIG. 8 is a flow chart of another example method that may be performed in accordance with one or more aspects as described herein. The method includes steps that may be used for, e.g., receiving, forwarding, and/or using data transferred to a receiving computing device (e.g., any of elements 101-104 and 301) that was sent by another sending computing device (e.g., any others of the elements 101-104 and 301). The data that is received and/or used in the method of FIG. 8 may be, for example, data that was sent over a wired path and/or a wireless path during step 608. The various steps in the flow chart of FIG. 8 may be performed by one or more devices and/or humans, such as any of the elements of FIGS. 1-5. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 801, the receiving computing device receives the data, such as in the form of one or more data packets (e.g., IP data packets) and/or other grouping of data. The data may be received by a given network connection of the receiving computing device. In this example, the receiving network connections are labeled as Connection C and Connection D. However, it will be understood that there may be more than two receiving network connections, and that the receiving network connections may comprise one or more wired network connections and/or one or more wireless network connections. Moreover, Connection C and Connection D may be different types of network connections (e.g., one wired and the other wireless) or the same type of network connection (e.g., both wired or both wireless).

Connections C and D may be implemented by, for example, the network I/O 409. The process of FIG. 8 may be repeatedly performed for each grouping of data. For example, the steps may be performed for each data packet (on a packet-by-packet basis), for each burst of data packets (on a burst-by-burst basis), for each of a set of multiple packets (e.g., every fixed or variable X number of packets), and/or on any other basis.

For example, assuming that the sending device is the computing device 103-A and the receiving device is the computing device 103-B, then the wired and/or wireless connections of the computing device 103-B may receive the data via the wired and/or wireless paths extending between the router 102 and the computing device 103-B (in the example of FIG. 1) or the wired and/or wireless paths extending between the computing device 103-A and the computing device 103-B (in the example of FIG. 2). Or, if the sending device is the computing device 103-A and the receiving device is the computing device 103-C, then the wired and/or wireless connections of the computing device 103-C may receive the data via the wired and/or wireless paths extending between the router 102 and the computing device 103-C (in the example of FIG. 1) or the wired and/or wireless paths extending between the gateway 101 and the computing device 103-C (in the example of FIG. 2). Or, if the sending device is the computing device 103-A and the receiving device is the router device 102, then the wired and/or wireless connections of the router device 102 may receive the data via the wired and/or wireless paths extending between the computing device 103-A and the router device 102.

At step 802, the receiving computing device determines whether the data received at step 801 was already received by an alternate connection (e.g., via an alternate path). For example, while the data may be sent to, and received by, the receiving computing device by Connection C (for example, a wired connection, e.g., through the wired path between the router 102 and the computing device 103-B), the data may have already been previously sent to, and received by, the receiving computing device by Connection D (for example, a wireless connection, e.g., through the wireless path between the router 102 and the computing device 103-B). Likewise, while the data may be sent to, and received by, the receiving computing device by a wireless connection (e.g., through the wireless path between the router 102 and the computing device 103-B), the data may have already been previously sent to, and received by, the receiving computing device by a wired connection (e.g., through the wired path between the router 102 and the computing device 103-B).

If the data is determined at step 802 to have been already received through an alternate connection, then the data may be ignored (e.g., discarded) at step 803. The data may be ignored because there is no need to receive any further instances of data that was already successfully received. Thus, if replicated data is redundantly sent over two paths (e.g., a wired path and a wireless path, or two wired paths, or two wireless paths), the data on the slower of the two paths would be ignored and the data on the faster of the two paths would be utilized.

If the data was not already received by an alternate connection (as determined at step 802), then the receiving device may log the data as currently being received. Such logging may be done actively as a separate activity or it may be inherent to the receiving process. For example, the receiving device may maintain a data log containing unique identifiers of the data packets or other groupings of data received, along with an indication of which connection (e.g., wired versus wireless) received the data packet. The unique identifiers may include unique portions of data packet headers and/or a hashing of the data packet(s) and/or portion(s) thereof. This may be considered an active logging of the data packets, since it may involve additional processing of the data packets to log the identifiers. The identifiers may be stored on a permanent or semi-permanent basis, such as in a first-in-first-out (FIFO) buffer. In such a case, step 802 may involve comparing data packets (or other groupings) received with the log of identifiers. As another example, the data packets themselves may be received into a FIFO buffer, one for each of the connections, and step 802 may involve comparing the received data with the data already in the FIFO buffer. This may be considered a passive logging, since the data packets or other groupings may already be stored in the FIFO buffer as an inherent part of the receiving process. In this latter situation, step 804 may not involve any extra processing and may in fact be skipped altogether.

Next, at step 805, the receiving computing device may determine whether the receiving computing device is itself the destination of the data. This may be determined by, for example, examining the header information of the data. If the receiving computing device is the indicated destination, then the data may be utilized by the receiving computing device at step 807. For example, the data may be interpreted and rendered as multimedia content and/or stored in a secondary storage device such as on a hard drive or a memory chip.

If the receiving computing device determines that it is not the destination indicated by the data, then at step 806, the receiving computing device may forward the data on one or more paths that is toward the destination. For example, if the receiving computing device is the router device 102 or the gateway device 101, then it is likely that neither of these devices are the intended destination, and so it may be typical for these devices to forward the data toward the destination. The forwarding at step 806 may involve sending the data over only a single path, or it may involve forwarding the data redundantly over two or more paths such as in the manner described with regard to FIGS. 6 and 7. Thus, for example, the data may be forwarded toward the destination using one or both of wired and wireless paths, and may use the process of FIGS. 6 and 7 to determine whether and/or how to send the data. As another example, data may be received by the receiving computing device over two or more communication paths, yet may forward the data (at step 806) using only a single communication path. Again, the receiving computing device may forward only the first-received instance of the data, and may ignore any later-received instances of the data.

While certain examples have been described above in which two communication paths have been used to transmit two copies of data, any of these examples may use more than two communications paths to transmit more than two copies of the data, such as three communication paths, four communication paths, or more. Any of these multiple communication paths may be used to simultaneously transmit the copies of the data, if desired. The number of communication paths used to transmit data may be dynamically determined based on any of the above-discussed factors such as network conditions.

Moreover, the various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

The invention claimed is:

1. A system comprising:
   a first computing device comprising:
      one or more first processors; and
      memory storing instructions that, when executed by the one or more first processors, cause the first computing device to:
         determine that first data is to be replicated, wherein determining that the first data is to be replicated is based at least in part on:
            a priority of the first data, and
            a comparison of a destination of the first data with information comprising a plurality of destinations, wherein the information associates each of the plurality of destinations with an indication of whether data is to be replicated;
         replicate, based on determining that the first data is to be replicated, the first data to generate second data;
         determine a first communication path to the destination of the first data;
         determine a second communication path to the destination of the first data, different from the first communication path;
         send, via the first communication path and to the destination of the first data, the first data; and
         send, via the second communication path and to the destination of the first data, the second data; and
   a second computing device comprising:
      one or more second processors; and
      memory storing instructions that, when executed by the one or more second processors, cause the second computing device to:
         receive, via the first communication path, the first data; and
         receive, via the second communication path, the second data.

2. The system of claim 1, wherein the instructions stored in the memory of the first computing device, when executed by the one or more first processors, cause the first computing device to:
   determine a condition of a network; and
   determine, based at least in part on the condition of the network, that the first data is to be replicated.

3. The system of claim 2, wherein the network comprises the first communication path.

4. The system of claim 1, wherein the instructions stored in the memory of the first computing device, when executed by the one or more first processors, cause the first computing device to:
   determine a condition of the first communication path; and
   determine, based at least in part on the condition of the first communication path, that the first data is to be replicated.

5. The system of claim 1, wherein the first communication path is a wired communication path and the second communication path is a wireless communication path.

6. The system of claim 1, wherein the instructions stored in the memory of the first computing device, when executed by the one or more first processors, cause the first computing device to send the first data and to send the second data by sending the first data and the second data substantially simultaneously.

7. The system of claim 1, wherein the first data is labeled with a first source identifier, and wherein the instructions stored in the memory of the first computing device, when executed by the one or more first processors, cause the first computing device to label the second data with a second source identifier different from the first source identifier.

8. The system of claim 1, wherein the destination of the first data comprises a network address.

9. The system of claim 1, wherein the instructions stored in the memory of the first computing device, when executed by the one or more first processors, cause the first computing device to determine, based at least in part on whether the first data comprises multimedia, that the first data is to be replicated.

10. The system of claim 1, wherein the first communication path comprises a coaxial cable and the second communication path is a wireless communication path.

11. The system of claim 1, wherein the instructions stored in the memory of the second computing device, when executed by the one or more second processors, further cause the second computing device to:
   record, in a log, an indicator that the first data was received; and
   delete the second data based on determining, based on the log, that the first data was received.

12. A system comprising:
   a first computing device; and
   a second computing device;
   wherein the first computing device comprises;
      one or more first processors; and
      memory storing instructions that, when executed by the one or more first processors, cause the first computing device to:
         determine that first data is to be replicated, wherein determining that the first data is to be replicated is based at least in part on:
            a priority of the first data, and
            a comparison of a destination of the first data with information comprising a plurality of destinations, wherein the information associates each of the plurality of destinations with an indication of whether data is to be replicated;
         based on determining that the first data is to be replicated, replicate the first data to generate replicated data; and
         send, via a plurality of different communication paths and to the second computing device, the first data and the replicated data, wherein the second computing device is one of the plurality of destinations; and
   wherein the second computing device comprises:
      one or more second processors, and
      memory storing instructions that, when executed by the one or more second processors, cause the second computing device to:
         receive, via the plurality of different communication paths, the first data and the replicated data.

13. The system of claim 12, wherein the plurality of different communication paths comprises a wired communication path and a wireless communication path.

14. The system of claim 12, wherein the instructions stored in the memory of the first computing device, when executed by the one or more first processors, cause the first computing device to send the first data and the replicated data by sending the first data and the replicated data substantially simultaneously.

15. The system of claim 12, wherein the first data is labeled with a source identifier, and wherein the instructions stored in memory of the first computing device, when executed by the one or more first processors, cause the first computing device to label the replicated data with one or more source identifiers different from the source identifier of the first data.

16. The system of claim 12, wherein each of the plurality of destinations corresponds to a different network address.

17. The system of claim 12, wherein the instructions stored in the memory of the first computing device, when executed by the one or more first processors, cause the first computing device to:
   determine a number of times to replicate the first data; and
   replicate the first data to generate the replicated data by replicating the first data the number of times.

18. The system of claim 17, wherein the instructions stored in the memory of the first computing device, when executed by the one or more first processors, cause the first computing device to determine the number of times to replicate the first data by determining, based at least in part on an amount of jitter or an amount of latency, the number of times.

19. A system comprising:
   a first computing device comprising:
      one or more first processors; and
      memory storing instructions that, when executed by the one or more first processors, cause the first computing device to:
         determine that a first data packet is to be replicated, wherein determining that the first data packet is to be replicated is based at least in part on:
            a quality of service designation indicated in the first data packet, and
            a comparison of a destination of the first data packet with information comprising a plurality of destinations, wherein the information associates each of the plurality of destinations with an indication of whether data is to be replicated;
         replicate, based on determining that the first data packet is to be replicated, at least a portion of the first data packet to generate a second data packet;
         determine, based on a network address of the first data packet, a first communication path;
         determine, based on the network address of the first data packet, a second communication path different from the first communication path;
         send, to the network address of the first data packet and via the first communication path, the first data packet; and
         send, to the network address of the first data packet and the second communication path, the second data packet; and
   a second computing device comprising:
      one or more second processors; and
      memory storing instructions that, when executed by the one or more second processors, cause the second computing device to:
         receive, via the first communication path, the first data packet; and
         receive, via the second communication path, the second data packet.

20. The system of claim 19, wherein the instructions stored in the memory of the first computing device, when executed by the one or more first processors, further cause the first computing device to:
   determine a condition of a network; and determine, based at least in part on the condition of the network, that the first data packet is to be replicated.

* * * * *

UNITED STATES PATENT AND TRADEMARK OFFICE
CERTIFICATE OF CORRECTION

PATENT NO. : 10,257,081 B2
APPLICATION NO. : 15/454825
DATED : April 9, 2019
INVENTOR(S) : Ross Gilson It is certified that error appears in the above-identified patent and that said Letters Patent is hereby corrected as shown below:

In the Drawings

Sheet 9 of 10, Step 504 (First Occurrence), Fig. 7:
Please delete "504" and insert --604--

Sheet 9 of 10, Step 504 (Second Occurrence), Fig. 7:
Please delete "504" and insert --604--

Sheet 9 of 10, Step 507, Fig. 7:
Please delete "507" and insert --607--

In the Specification

Column 8, Detailed Description, Line 10:
Please delete "202," and insert --402,--

Column 8, Detailed Description, Line 10:
Please delete "203," and insert --403,--

Column 8, Detailed Description, Line 11:
Please delete "204," and insert --404,--

Column 8, Detailed Description, Line 11:
Please delete "205," and insert --405,--

Column 8, Detailed Description, Line 13:
Please delete "201" and insert --401--

Signed and Sealed this
Eleventh Day of May, 2021

Drew Hirshfeld
*Performing the Functions and Duties of the
Under Secretary of Commerce for Intellectual Property and
Director of the United States Patent and Trademark Office*

In the Claims

Column 17, Line 30:
Please in Claim 12, delete "comprises;" and insert --comprises:--

Column 18, Line 52:
Please in Claim 19, after "and", insert --via--